W. A. GOETZE & W. A. DAY.
TIRE VALVE.
APPLICATION FILED AUG. 26, 1911.
1,093,397.
Patented Apr. 14, 1914.
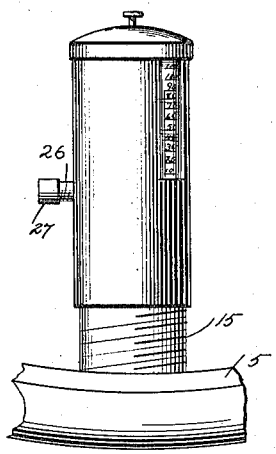
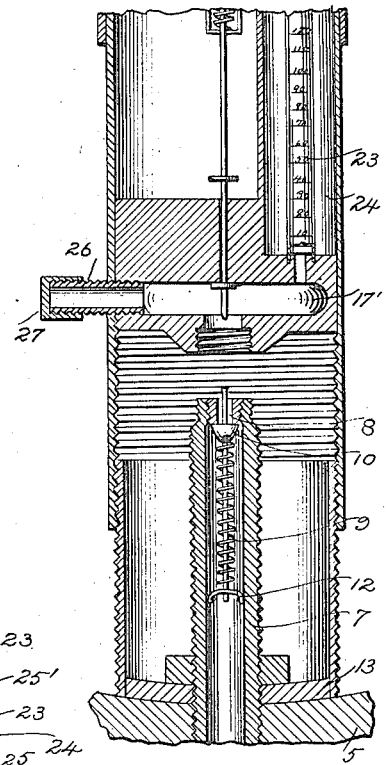
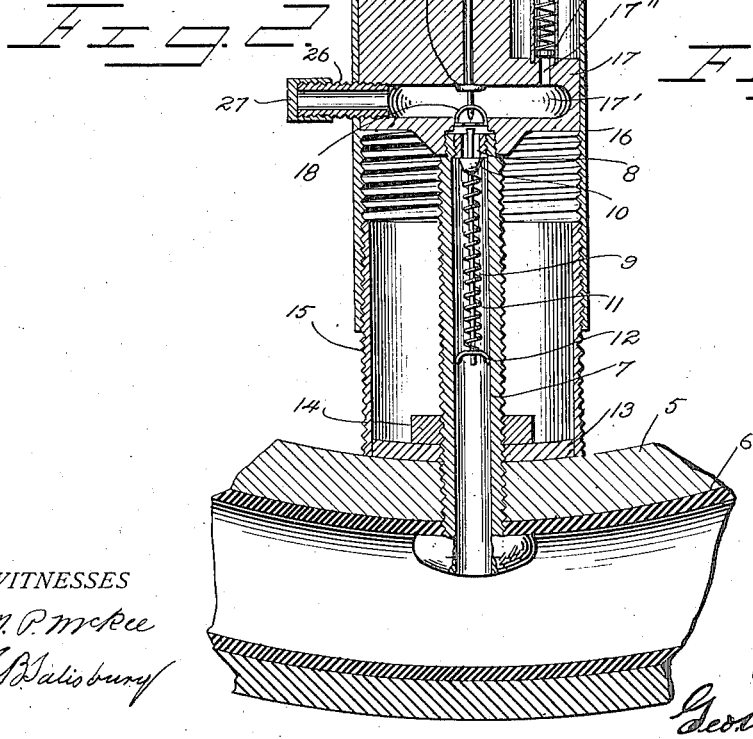
WITNESSES
M. P. McKee
E. B. Salisbury
INVENTORS
W. A. Goetze
W. A. Day
Geo. Wedderburn
Attorney

UNITED STATES PATENT OFFICE.

WILLIAM A. GOETZE AND WALTER A. DAY, OF WEAVERVILLE, CALIFORNIA.

TIRE-VALVE.

1,093,397.

Specification of Letters Patent. Patented Apr. 14, 1914.

Application filed August 26, 1911. Serial No. 646,225.

*To all whom it may concern:*

Be it known that we, WILLIAM A. GOETZE and WALTER A. DAY, citizens of the United States, residing at Weaverville, in the county of Trinity and State of California, have invented certain new and useful Improvements in Tire-Valves, of which the following is a specification.

This invention relates to improvements in tire valves, the leading object in view is to provide a supplemental tire valve adapted to be mounted on the usual tire valve and adapted to indicate the pressure of air in the tire.

With the above and other objects in view the invention relates to certain improvements, combination, and arrangement of parts clearly illustrated in the accompanying drawing and described in the following specification.

In the accompanying drawings; Figure 1 is a side elevation showing a supplemental valve mounted on the usual tire valve; Fig. 2 is a vertical sectional view thereof; Fig. 3 is a vertical sectional view showing the valve operating rod raised to an inoperative position.

Referring to the accompanying drawing 5 denotes an outer tube of the tire and 6 the inner tube thereof. The usual valve casing 7 is secured to the tubes 5 and 6 and said casing carries in its upper end a valve seat 8, a valve rod 9 is disposed within the casing and carries on its upper end a valve 10 which is adapted to close communication between the atmosphere and inner tube. The usual spring 11 is mounted on the rod 9 and serves to hold the valve 10 against the seat 8. A spider 12 serves as a guide for the rod 9 and a stop for the spring 11.

The casing 7 is formed with external screw threads and a disk 13 is threaded on said casing and a lock nut 14 is threaded on said casing against said disk 13. A tube 15 is mounted on the disk 13 and is threaded into the tube 16 which carries a plug 17 having its lower end recessed and screw threaded to the upper end of the casing 7. A guide 18, in the form of a spider is fitted in the recess of the plug 17 directly over the upper end of the rod 9, which projects normally above the valve seat 8. A plunger rod 19 is slidable through an opening formed in the plug 17 and is provided with stops 19' spaced on either side of faces of said plug 17. The upper end of the rod 19 extends through the end walls 16' of the casing 16 and through a cap 20 mounted on said casing and is provided with a terminal head 21 adapted to be manipulated by a thumb. A small casing 22 is secured to the inner side of the end wall 16' and a spring 22' is disposed in said casing 22 and is adapted to hold the lower end of the rod 19 spaced from the upper end of the rod 9 the upper end of spring 22' is securely attached to rod 19 by any suitable means in such a manner that when the terminal hood 21 is pressed downwardly, the said spring 22' will be actuated.

The plug 17 is formed with a transverse air passage 17' which communicates with the recess in the lower end of said plug and a small passage 17'' communicating with said passage 17'. A glass tube 23 having graduations 23' is disposed in a space 24 formed in said plug and said tube 23 is formed with an opened lower end communicating with the passage 17''. Within the tube 23 an indicating disk 25 is disposed, against said indicating disk a spring 25' exerts pressure and normally holds said element in a closing position over the passage 17''. By pressing the valve operating rod 19 inwardly the valve 10 will be forced from its seat so that air may flow through the casing into the passage 17' and thence through the passage 17'' into the tube 23 forcing the disk into the tube 23 and thereby indicating the air pressure in the inner tube. The plug 17 has secured thereto a tap 26 and a cap 27 is fitted on the tap by a screw threaded connection. By removing the cap 27 air compressed in the passage 17' may be permitted to escape so as to restore the disk 25 to its normal position.

Having described our invention, we claim;

1. In combination with a tire valve having a casing and an air valve working in said casing, a casing mounted over said first casing, a plug disposed in said casing and provided with a passage adapted to communicate with the first casing, a rod movable in said second casing and adapted to unseat the valve, an indicating tube disposed in said second casing and communicating with said passage, a disk movable in said indicating tube, and a spring disposed in said indicating tube and adapted to hold said disk in its outermost position therein.

2. In combination, a tire valve having a casing and an air valve working in said casing and provided with a stem projecting above said casing, a casing mounted over said first casing, a plug having passages therein disposed in said casing, an indicating tube disposed in said second casing and having communication with said passages, a disk movable in said tube and adapted to control said communication, a spring in said tube adapted to hold said disk in a closing position, a spring controlled rod movable in said casing across the plug and adapted to engage the upper end of the valve stem and unseat said valve, stops on said rod adapted to limit the movement thereof, and a tap communicating with one of said passages.

3. In combination with a tire inlet-tube, a valve in said tube, a spring in said tube holding said valve seated, a tubular seat for said valve in said inlet tube, a rod on said valve projecting from said tube, a casing removably engaging said first casing, a push-rod carried by said casing disposed in alinement with said first-named spring, a spring in said casing engaging said push-rod adapted to engage said first-named rod to move said valve against the tension of said first-named spring, a tube mounted in said casing, a member supporting said tube and having an opening, a disk in said tube covering said opening, a spring in said tube bearing against said disk, said member formed with a channel communicating with the tubes and with said opening, and a cap-controlled outlet pipe mounted on said casing.

In testimony whereof we affix our signatures in presence of two witnesses.

WILLIAM A. GOETZE.
WALTER A. DAY.

Witnesses:
J. F. TOURTELLOTTE,
H. R. GIVEN.